(12) United States Patent
Watanabe et al.

(10) Patent No.: US 7,284,133 B2
(45) Date of Patent: Oct. 16, 2007

(54) INFORMATION PROCESSING UNIT

(75) Inventors: Takashi Watanabe, Kokubunji (JP);
Masahiro Kaminaga, Sakado (JP);
Takashi Endo, Musashimurayama (JP);
Seiichi Kumano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 541 days.

(21) Appl. No.: 10/153,616

(22) Filed: May 24, 2002

(65) Prior Publication Data
US 2003/0091191 A1 May 15, 2003

(30) Foreign Application Priority Data
Oct. 30, 2001 (JP) .............................. 2001-331856

(51) Int. Cl.
*G06F 12/14* (2006.01)
(52) U.S. Cl. .......................................... 713/189; 726/22
(58) Field of Classification Search ................. 713/189
See application file for complete search history.

(56) References Cited

U.S. PATENT DOCUMENTS

| | | | |
|---|---|---|---|
| 4,746,788 A | | 5/1988 | Kawana |
| 4,987,595 A | * | 1/1991 | Marino et al. ............... 713/164 |
| 5,222,137 A | * | 6/1993 | Barrett et al. ................ 380/271 |
| 5,303,293 A | * | 4/1994 | Bettenhausen .................. 380/2 |
| 5,404,402 A | * | 4/1995 | Sprunk ........................ 713/189 |
| 5,511,124 A | * | 4/1996 | Bergner ....................... 380/261 |
| 5,512,977 A | * | 4/1996 | Imai ............................ 399/366 |
| 5,631,960 A | * | 5/1997 | Likens et al. .................... 380/2 |
| 5,724,427 A | * | 3/1998 | Reeds, III .................... 380/259 |
| 5,887,064 A | * | 3/1999 | Seysen ........................ 713/172 |
| 6,018,581 A | * | 1/2000 | Shona et al. ................... 380/46 |
| 6,028,939 A | * | 2/2000 | Yin ............................. 713/189 |
| 6,055,316 A | * | 4/2000 | Perlman et al. .............. 380/262 |
| 6,067,621 A | | 5/2000 | Yu et al. |
| 6,081,896 A | * | 6/2000 | Johns-Vano et al. ............ 726/1 |
| 6,088,800 A | * | 7/2000 | Jones et al. .................. 713/189 |
| 6,094,486 A | * | 7/2000 | Marchant ...................... 380/52 |
| 6,125,182 A | * | 9/2000 | Satterfield .................... 380/28 |

(Continued)

FOREIGN PATENT DOCUMENTS

DE 3418571 5/1984

(Continued)

OTHER PUBLICATIONS

Rivest et al., Randomized Encryption Techniques, 1998, Springer-Verlag, pp. 145-163.*

(Continued)

*Primary Examiner*—Nasser Moazzami
*Assistant Examiner*—David Garcia Cervetti
(74) *Attorney, Agent, or Firm*—Reed Smith LLP; Stanley P. Fisher, Esq.; Juan Carlos A. Marquez, Esq.

(57) ABSTRACT

An information processing unit and methods therefore which render it more difficult to infer information being processed within an information processing unit by observing the unit's current consumption or electromagnetic radiation. Specifically, the information processing unit preferably encrypts and decrypts data when the data is read from/written to memories within the unit. The encryption/decryption process may include the use of multiple cryptographic keys, permutated data storage locations, randomly generated keys, and permutated data processing steps.

17 Claims, 10 Drawing Sheets

U.S. PATENT DOCUMENTS

| | | | |
|---|---|---|---|
| 6,240,183 B1* | 5/2001 | Marchant | 380/28 |
| 6,295,604 B1* | 9/2001 | Callum | 713/160 |
| 6,320,964 B1* | 11/2001 | Callum | 380/29 |
| 6,347,143 B1* | 2/2002 | Goff et al. | 380/37 |
| 6,353,888 B1* | 3/2002 | Kakehi et al. | 713/168 |
| 6,366,117 B1* | 4/2002 | Pang et al. | 326/38 |
| 6,393,565 B1* | 5/2002 | Lockhart et al. | 713/172 |
| 6,445,797 B1* | 9/2002 | McGough | 380/285 |
| 6,570,988 B1* | 5/2003 | Venkatesan et al. | 380/28 |
| 6,598,163 B1* | 7/2003 | Jakobsson | 713/176 |
| 6,724,894 B1* | 4/2004 | Singer | 380/28 |
| 6,873,706 B1* | 3/2005 | Miyazaki et al. | 380/30 |
| 6,904,150 B1* | 6/2005 | Dent | 380/28 |
| 6,931,532 B1* | 8/2005 | Davis et al. | 713/167 |
| 6,961,849 B1* | 11/2005 | Davis et al. | 713/167 |
| 6,978,367 B1* | 12/2005 | Hind et al. | 713/167 |
| 2001/0025340 A1* | 9/2001 | Marchant | 713/150 |
| 2002/0026345 A1* | 2/2002 | Juels | 705/10 |

FOREIGN PATENT DOCUMENTS

| | | |
|---|---|---|
| JP | 10-22990 | 6/1996 |
| WO | WO 99/63696 | 6/1999 |

OTHER PUBLICATIONS

Kocher et al., Introduction to Differential Power Analysis and Related Attacks, 1998, Cryptography Research.*

Paul Kocher, Joshua Jaffe and Benjamin Jun, "Differential Power Analysis", Cryptography Research, Inc., pp. 388-397.

R.L. Rivest, A. Shamir and L. Adleman, "A Method for Obtaining Digital Signatures and Public-Key Cryptosystems", Association for Computing Machinery, Sep. 1, 1977, pp. 1-15.

"Data Encryption Standards", U.S. Department of Commerce/National Institute of Technology, Federal Information Processing Standards Publication, Oct. 25, 1999, pp. 1-22.

European Patent Office Search Report dated Feb. 7, 2003.

Japanese Office Action dated Apr. 9, 2007 with English translation.

* cited by examiner

FIG. 15

INFORMATION PROCESSING UNIT

CLAIM OF PRIORITY

This application claims priority to Japanese Patent Application No. 2001-331856 filed on Oct. 30, 2001.

BACKGROUND OF THE INVENTION

1. Field of the Invention

The present invention relates to an information processing unit, more particularly to a method of encrypting and decrypting data to be processed in an information processing unit, and still more particularly to a method of encrypting and decrypting data used within an information processing unit.

2. Description of the Background

Figure 1:
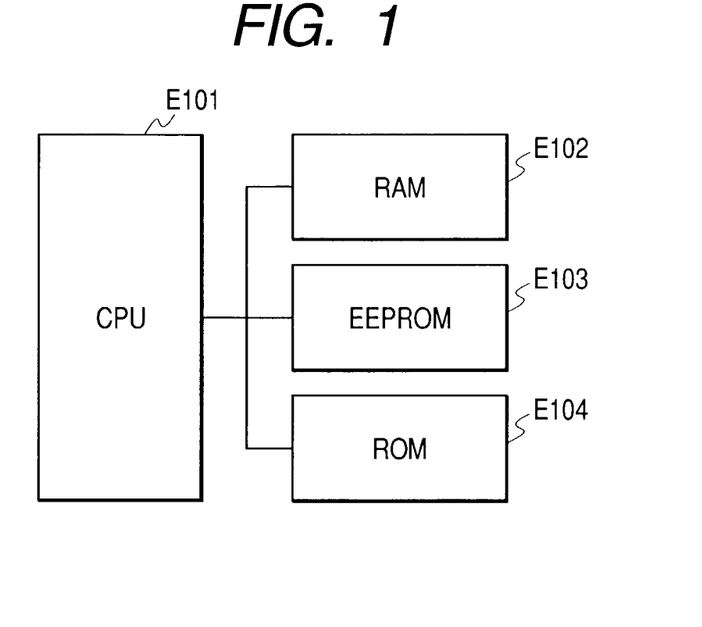
FIG. 1 is a block diagram showing the basic structure of an information processing unit.

Most IC (integrated circuit) cards and household electrical information appliances are equipped with information processing units based on a common structure shown in FIG. 1. These information processing units have only a limited amount of processing power and memory space, such as an 8-bit central processing unit (CPU) E101, on the order of 10 KB of volatile memory (RAM E102), and some amount of nonvolatile memory (EEPROM E103 and ROM E104). Network node devices' and routers, however, which generally use cryptographic processing, have a larger amount of processing power and memory space, such as a 32-bit CPU and several hundred megabytes of volatile memory (RAM). The latter also have fewer limitations on system size and maximum power consumption than the former, which cannot increase their processing capabilities by boosting the clock rate of the processor or by adding external hardware.

Adding computer hardware to a variety of electrical information appliances and systems is becoming pervasive, and, accordingly, the storage and use of various information and the exchange of data between computers has come to be performed more frequently. It is increasingly necessary, therefore, to process data that requires protection against leakage to the outside during computer-to-computer data exchanges, such as electronic money, billing information, and private information. Cryptographic techniques are indispensable for processing such information in secrecy.

Typical of the cryptographic systems now being used are DES (Data Encryption Standard)(National Bureau of Standards, *Data Encryption Standard*, U.S. Department of Commerce, FIPS pub. 46, January 1977) and RSA (named after its inventors, Rivest, Shamir, and Adleman)(R. L. Rivest, A. Shamir, and L. M. Adleman, *A method for obtaining digital signatures and public-key cryptosystems*, Communications of the ACM (2) 21 (1978), 120-126). The former is a secret-key cryptosystem, and the latter is a public-key cryptosystem. A secret-key cryptosystem uses a common secret key for encryption and decryption and is also referred to as a common-key cryptosystem or a symmetric-key cryptosystem. On the other hand, a public-key cryptosystem uses different keys for encryption and decryption and is also referred to as an asymmetric-key cryptosystem. In general, the cipher used in a secret-key cryptosystem, involves the combination of 64 to 128 bit input data with 64 to 128 key bits by substitution of bit relationships and permutation of bit positions, concurrently performed a plurality of times.

The only calculations required in a secret-key cryptosystem are bit operations and reference to relatively small tables, making it possible for even an information processing unit with comparatively modest capabilities to complete the processing in a short time, such as a few milliseconds.

The keys in a public-key cryptosystem are restricted by mathematical relationships that must hold between the encryption and decryption keys, so the keys generated in these systems are likely to be long, such as 1024 bits. In addition, extensive numerical calculations are performed, taking a few hundred milliseconds for an information processing unit with comparatively small processing power, even if a co-processor is used.

A secret-key cryptosystem provides a key shared by the sender and receiver in advance, thereby enabling faster processing; a public-key cryptosystem lays the encryption key open to the public for one side to use to encrypt data while the other side decrypts by using a secret decryption key. This system achieves greater security, but it requires more time for calculation than a secret-key cryptosystem. Therefore, secret-key cryptosystems are often used for cryptographic processing of data used within the same information processing unit, while public-key cryptosystems are used for cryptographic processing of data exchanged among different information processing units.

An information processing unit which stores secret information in the nonvolatile memory device may use a secret-key cryptosystem to encrypt the information and maintain the encrypted information, in case the memory device is taken out and physically analyzed while the system is powered off. Secret information can be kept secure in this way by having the user memorize the cryptographic key in a scrambled form that cannot be unscrambled easily by a third party. Methods using DES and other secret-key cryptosystems are also implemented by disclosed software, such as PGP (Pretty Good Privacy), as cryptographic algorithms for data stored in external storage devices.

For security, however, encryption only of data to be stored in external storage devices is inadequate, it is also necessary to keep data secret within the system unit that performs encryption and decryption of the data. The present invention provides hardware that achieves this goal with comparatively small resources, including just a few registers for holding key data, calculation equipment, and an information processing unit with comparatively small processing power, the small hardware scale also enabling faster processing. An information processing unit according to the present invention can perform processing that is secure against information leakage. Attention was drawn to this problem by a cryptographic analysis method known as DPA (Differential Power Analysis) (See, P. Kocher, J. Jaffe, and B. Junn, *Differential Power Analysis, Advances in Cryptology CYPT'99*, Lecture Note in Computer Science 1666, Springer-Verlag, pp388-397, 1999), presented by P. Kocher in 1998. The disclosure of this method showed the necessity for the protection not only of data stored in external storage devices but also data being operated on in arithmetic and logic units. DPA is an analysis technique that observes how current consumption varies with the data being operated on to determine the state of a certain bit. The essence of this analysis technique lies in utilization of the correlation between the data being processed by an information processing unit and the corresponding current consumption.

The current consumption of an information processing unit varies with the data being processed. The data to be processed is characterized by two parameters: one indicating its notation and the other indicating its location, such as binary notation in computers and the address in a CPU address space. Conventional information processing units present processed data in a combination of inputs and outputs. Because of the properties of the CMOS chips used in integrated circuits, current consumption differs depending on whether a "1" or a "0" is being processed.

Suppose the current consumption when data x located at address a is processed is expressed in the form c(x, a); and the number of "1's" of data x in binary notation, referred to as its Hamming weight, is expressed as H(x). If the bus width of the information processing unit is w bits, obviously $0 \leq H(x) \leq w$. Note that binary notation is also used in accessing address a. Suppose also that the current consumption in processing a "1" is d1, and the current consumption in processing a "0" is d0. If, for example, the widths of the data bus and address bus of the information processing unit are 8 bits, then $$C(x, a) = (H(x)+H(a))d1 + ((8-H(x))+(8-H(a)))d0 + \alpha + \beta$$

where $\alpha$ is the power consumption added when a specific part of the information processing unit operates, and $\beta$ is noise caused by the measurement equipment.

First, $\alpha$ and $\beta$, which are elements independent of the data, need to be eliminated. If an information processing unit is kept in a given state and processes two different items of data, x0 and x1, the values of $\alpha 0$ and $\alpha 1$ in the following equations indicating current consumption in processing x0 and x1, respectively, will be the same.

$$C(x0, a0) = (H(x0)+H(a0))d1 + ((8-H(x0))+(8-H(a0)))d0 + \alpha 0 + \beta 0$$

and $$C(x1, a1) = (H(x1)+H(a1))d1 + ((8-H(x1))+(8-H(a1)))d0 + \alpha 1 + \beta 1$$

Then, if the noise terms $\beta 0$ and $\beta 1$ can be eliminated, it is possible to compare data x0 with data x1 by comparing c(x0, a0) and c(x1, a1). Since $\beta$ is a noise quantity, its mean value is 0. Therefore, $\beta$ can be eliminated by calculating the mean value of n current consumption measurements c[0] to c[n−1], by dividing their sum by n, if n is sufficiently large. If $\beta 0$ and $\beta 1$ are eliminated in this way, then $$c(x0, a0)-c(x1, a1) = ((H(x0)+H(a))(H(x1)+H(a1)))d1 + ((H(x1)+H(a1))-(H(x0)+h(a0)))d0$$

and if the two items of data are placed at the same address, that is, a0=a1, then $$c(x0, a0)-c(x1, a1) = (H(x0)-H(x1))d1 - (H(x0)-H(x1))d0$$

Furthermore, if d=d1−d0, the equation above can be reduced to $C(x0, a0)-c(x1, a1) = (H(x0)-H(x1))d$ It is impractical to track and know which part of the information processing unit is operating at some point in time, so it is difficult to obtain $\alpha$. It is easier, however, to find the difference d, instead of the absolute values of d1 and d0, by taking differences of data, with a becoming an offset. Consequently, based on this information, it is possible to know the Hamming weight difference between data x0 and x1 from the expression c(x0, a0)−c(x1, a1). Before actual data are inferred, for an 8-bit bus it is useful to check the power consumption of nine data items with Hamming weights of 0 to 8 in advance, for example, as a basic test. As the nine data items, suppose 0, 1, 3, 7, 15, 31, 63, 127, and 255 are used, which are expressed as b'0, b'1, b'11, b'111, b'1111, b'11111, b'111111, b'1111111, and b'11111111 in binary notation, and have Hamming weights 0, 1, 2, 3, 4, 5, 6, 7, and 8. If the difference between the basic test data and the obtained data is calculated, it is possible to obtain data with a difference of 0 in Hamming weight from the data to be processed.

Suppose the current consumption observed during a calculation with the data being processed matches data 1 obtained from the basic test. This means the Hamming weight of the data to be processed is 1. 8-bit numeric values with Hamming weight 1 are 1, 2, 4, 8, 16, 32, 64, and 128, so it is possible to know that the value of the data being processed is one of these values. Depending on the architecture of the information processing technology, there are cases in which current consumption may differ depending on the bit positions (0 to 7) in an 8-bit bus. In this case, it is possible to uniquely determine the data being processed by obtaining all $2^8=256$ basic test data items in advance and comparing them with the data being processed, one by one. If data can be obtained in this way in the key operation part of a cryptographic processing unit, ciphers can be easily decrypted.

The elimination of the value of noise $\beta$ described above then becomes a problem. In general, an information processing unit is caused to operate on the same data n times, where n is an adequately large number, so the current consumption patterns c[0] to c[n−1] are obtained, and their mean value can be calculated. The mean value of $\beta$ is 0, and accordingly $\beta$ can be eliminated. It should be noted that information that tends not to change, such as private information, is more prone to leakage when noise is eliminated by averaging data measured a plurality of times. The value of n cannot be defined easily because it depends on the noise source of the information processing unit and the accuracy of the measurement equipment. However, if the actual value of n cannot be derived, it is permissible simply to keep repeating the measurement until the noise is eliminated. A possible countermeasure against such data analysis would be to disable operations repeated a number of times adequate to eliminate noise through averaging.

Since information processing units operate on electric current, it is impractical to eliminate the correlation between the information being processed and the current consumption. Therefore, data being processed must be encrypted to make it impossible for the analyzers to infer the contents of data. The DES cryptosystem described above and other such cryptographic algorithms can be used, but they take too long, and require too many hardware resources such as registers and volatile memory space for data encryption, to be suitable for use in units with comparatively small processing power which must encrypt and decrypt data on demand. Encryption/decryption units that can perform cryptographic processing with minimal hardware resources and processing time are required.

SUMMARY OF THE INVENTION

An information processing unit according to the present invention encrypts the contents of data exchanged between a memory device and calculation equipment, thereby making it possible to break the correlation between data to be processed and current consumption. Therefore, an analyzer who checks current consumption when the data is processed cannot learn the contents of the data. In addition, the information processing unit according to the present invention can encrypt and decrypt data both automatically and transparently. Therefore, it can provide security against current-consumption analysis by a third party without having to call the user's attention to the encryption and decryption processes.

An information processing unit according to at least one embodiment of the present invention encrypts data that is being stored in a memory device or that is newly generated, and stores the encrypted data in the memory device. Since data is output from the calculation equipment in a form that can not be predicted by an external attacker, the external attacker cannot perform analysis using the data as a clue. In particular, changing the key data used for encryption periodically or randomly can make information about the key data that has been stored by an external attacker invalid after some point in time. When the key is changed, re-encryption of data that has already been encrypted and stored is performed. The re-encryption may be implemented by decrypting the encrypted data with the original key, and encrypting the decrypted data afresh with the changed key. Alternatively, the original encrypted data may be encrypted with the changed key without being decrypted, and a new key enabling decryption of the newly encrypted data can be generated from the original key and the changed key and stored. In this way, the decrypted data can be protected against external attack, resulting in improved security.

In some cases, an attacker may notice that an item of input data is processed a plurality of times in the information processing unit. As just described above, the processed data is encrypted and takes different forms in each operation. However, if the same data is processed in the same order, there may be cases in which the noise that can be observed and measured during current consumption analysis can be eliminated. Data extending over a plurality of blocks is generally processed sequentially from the top block, so an attacker will attempt data analysis on this assumption. The present invention executes processing of data blocks in a random order which can not be predicted by attackers, thereby making the analysis more difficult. When the execution order is changed, it is possible to permute the data in a predetermined or random order and execute the processing sequentially from the top block, or it is possible to take data directly from the storage position without permuting it. Encrypting data with permutation thereof can make the analysis still more difficult.

Permuting data storage positions physically or logically prevents information leakage depending on address information for designating data storage positions or physical characteristics of the storage positions even if the same data is used repetitively, thereby enabling more secure information processing. Data storage positions may be made dependent on the contents of data, may be determined by the applicable data storage position controller, or may be randomized.

It should be noted that the present invention is applicable to information processing units having an external interface such as an I/O port as a data input terminal or output terminal, or as both.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

Embodiments of the invention will now be described with reference to the attached drawings, on the assumption that encryption and decryption are performed using a secret-key cryptosystem.

First Exemplary Embodiment

Figure 2:
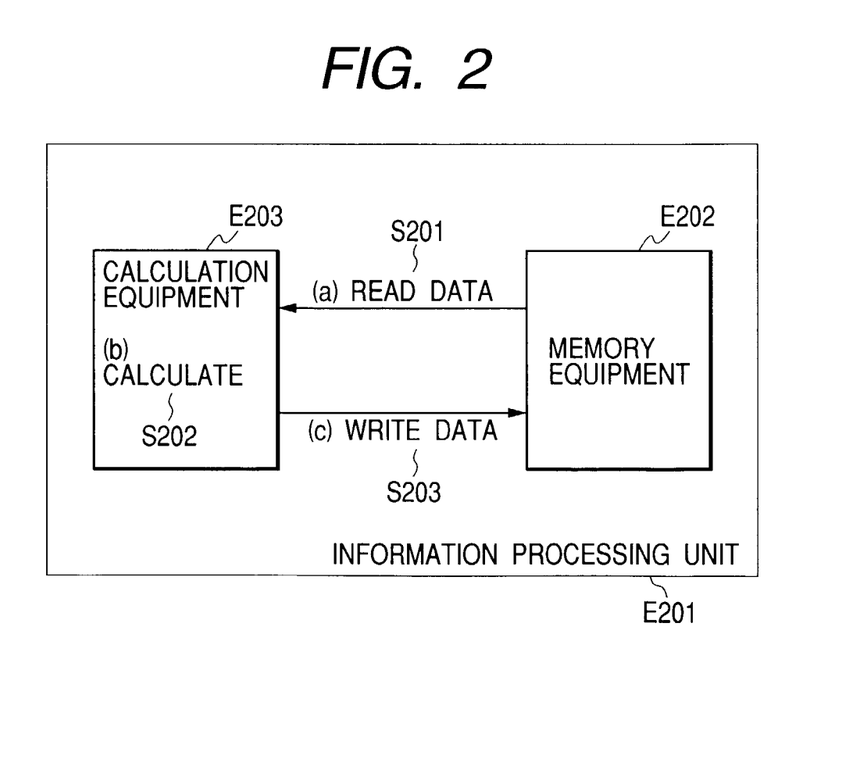
FIG. 2 is a block diagram showing a basic operation flow of an information processing unit.

This embodiment relates to the encryption of data to be processed. As shown in FIG. 2, data processing by an information processing unit E201 basically comprises: (a) the reading of data from a memory device E202 (step S201); (b) calculation by calculation equipment E203 (step S202); and (c) the writing of data into the memory device E202 (step S203). At this time, various types of data items are read from the memory device E202 depending on the purpose or status of the unit. In this example, the data items are assumed to have fixed values, such as the ID number of the information processing unit, private information of the owner, and the encryption keys. If such fixed values are read by an information processing unit without the countermeasures provided by the present invention, an attacker may be able to obtain the corresponding data by using the methods described above.

Figure 3:
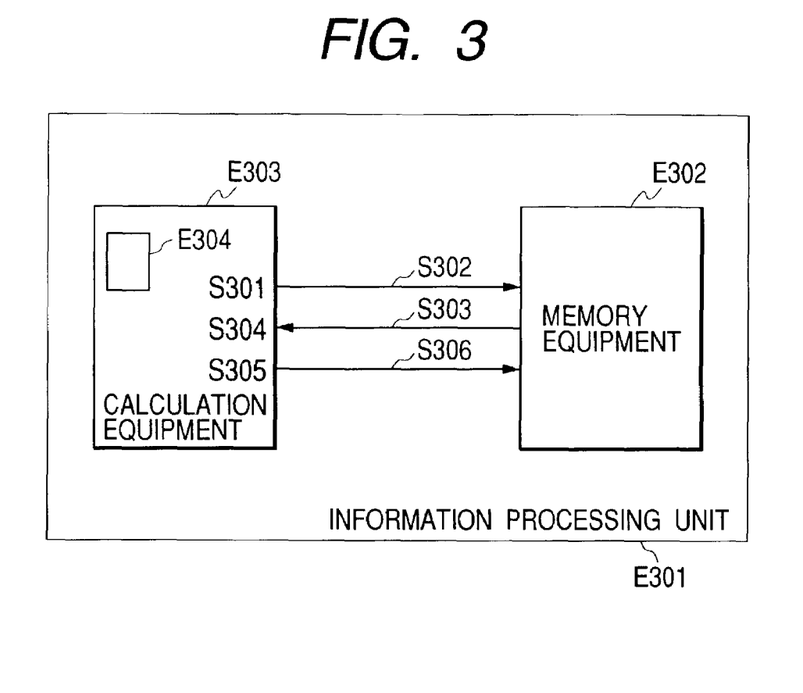
FIG. 3 is a block diagram showing an encryption/decryption unit for data within a memory device by calculation equipment.

An information processing unit E301 according to this embodiment, shown in FIG. 3, initially stores data d[0] in a memory device E302 by encrypting the data d[0] with key data k[0] stored in another memory device E304 (step S301) to obtain encrypted data d'[0] which is then stored in the memory device E302 (step S302). In step (a) described above, after reading data d'[0] from the memory device E302 (step S303), calculation equipment E303 can obtain data d[0] by decrypting d'[0] with the key data k[0] (step S304). Next, the calculation equipment E303 encrypts the data d[0] afresh with new key data k[1] stored in the memory device E304 to obtain data d"[0] (step S305) and stores the data d"[0] in the memory device E302 (step S306). Therefore, the data preferably changes every time it is read out.

Figure 4:
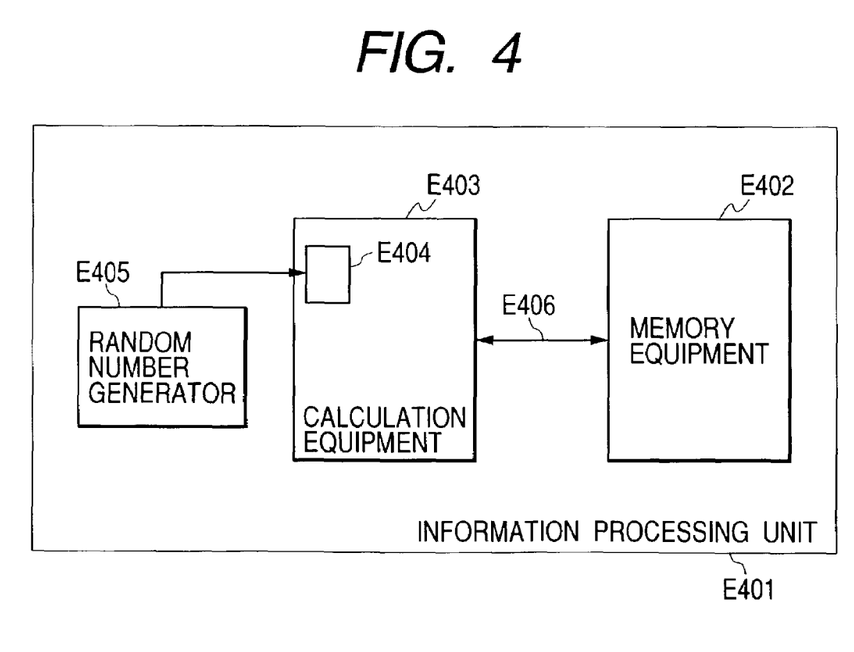
FIG. 4 is a block diagram showing an encryption/decryption unit for data within a memory device by calculation equipment with a random number generator.

Although d[0] is re-encrypted with k[1] in this example, d'[0] may be encrypted instead to obtain d'''[0]. In this case, the data d'''[0] is decrypted by using k[1] and k[0] sequentially. In another example, a new key k'[0] is generated from k[1] and k[0] for direct decryption of d'''[0] to d[0]. In particular, if an XOR operation is used as the cryptographic processing method, the following relationship holds $d'''[0]=d'[0] \text{ XOR } k[1]=(d[0] \text{ XOR } k[0]) \text{ XOR } k[1]=d[0] \text{ XOR}(k[0] \text{ XOR } k[1])$ Therefore, if k'[0]=k[0] XOR k[1] is used, then $d'''[0] \text{ XOR } k'[0]=d[0] \text{ XOR}(k[0] \text{ XOR } k[1]) \text{ XOR}(k[0] \text{ XOR } k[1])=d[0]$ Thus decryption can be implemented. Addition or multiplication operations in finite fields can also be used instead of the XOR operation to cause the same relationship to hold. Data prepared by the user or provided by the information processing unit itself can be stored in the memory device for use as non-random key data, or the output from a random number generator E405 can be stored in the memory device as shown in FIG. 4 for use as key data.

Figure 5:
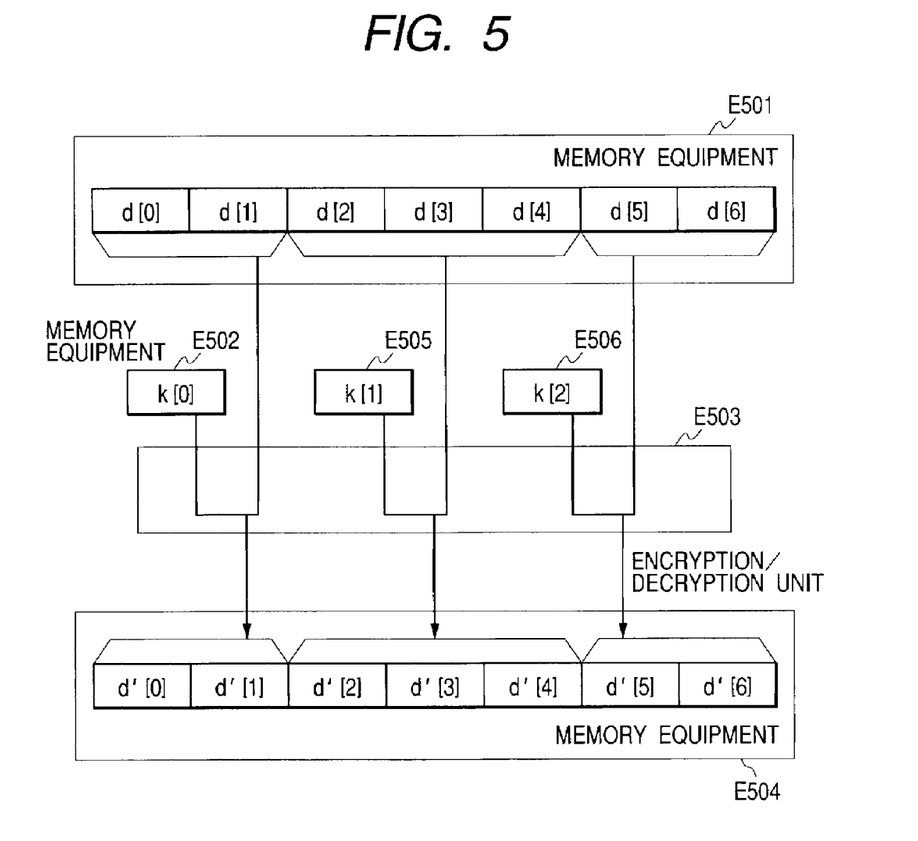
FIG. 5 is a block diagram showing an encryption/decryption unit for undefined length data using a plurality of items of key data.
Figure 6:
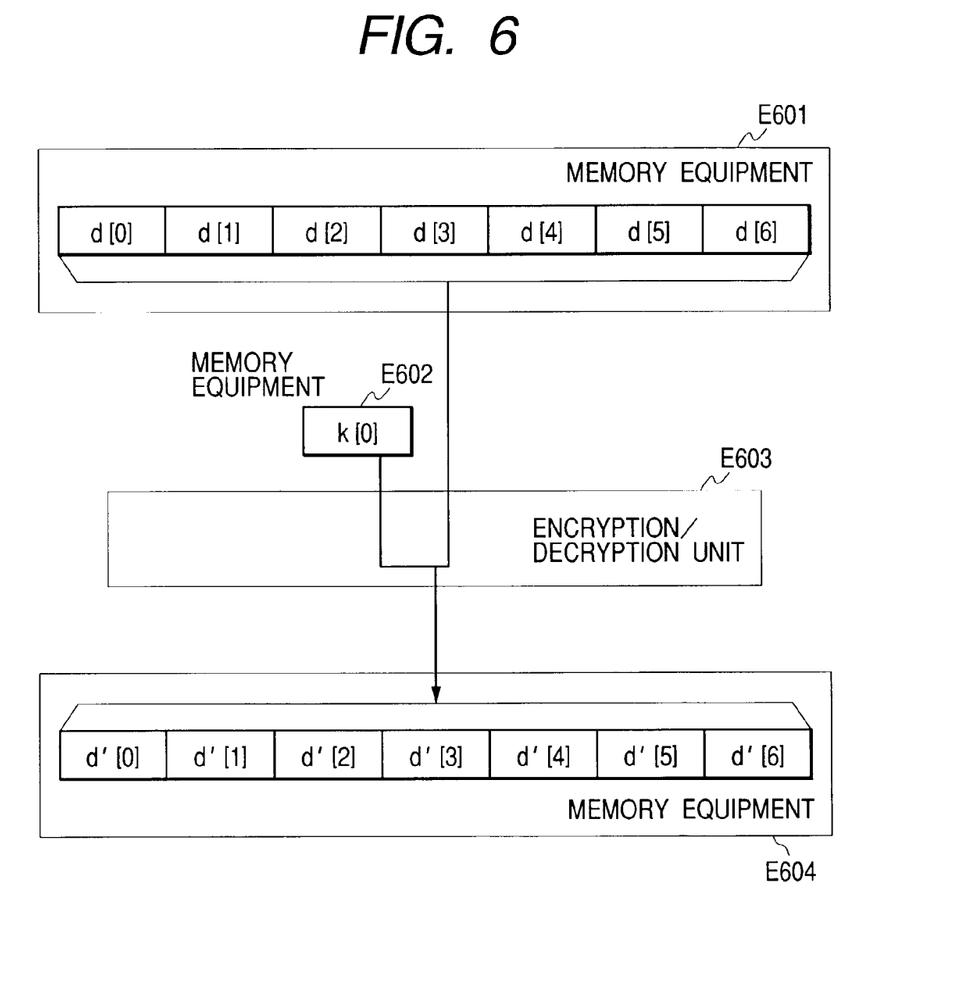
FIG. 6 is a block diagram showing an encryption/decryption unit using an item of key data.

A plurality of encryption keys may be prepared corresponding to each possible data length as shown in FIG. 5, or a common key may be used by the entire memory device as shown in FIG. 6. The two memory devices E501 and E504 shown in FIG. 5 may be independent memory devices, or they may be combined into one memory device from which data is read and into which data is written. There may be a plurality of memory devices E502, E505, and E506 for storing key data, or the memory devices E502, E505, and E506 may be a single memory device in which the key data is updated sequentially.

When key data k[0] is updated to key data k[1], data stored in a region encrypted with the same key data k[0] is encrypted afresh with the key data k[1]. Reducing the size of the region reduces the amount of re-encryption necessary when the key data is updated, thereby reducing the processing load, but requires addition of a new memory device for holding a plurality of key data items or processing for updating key data.

The user can manually direct the updating of encryption keys and re-encrypt data held in a memory device, or an encryption/decryption unit can be made to perform the updating automatically.

Suppose DES is used as the cryptographic algorithm. DES uses 56-bit key data, 64-bit input, and 64-bit output. Now suppose 64-bit data d'[0] that has been encrypted with a 56-bit key data k[0] and stored in the memory device is read out. Next, a new 56-bit key data k[1] is generated by the random number generator. If the number of 64-bit blocks in the region encrypted with key data k[0] is n (where n is a natural number), the stored data d[i] (where i varies from 0 to n) is read in 64-bit units from the top block in the memory device sequentially or in random order and decrypted with key data k[0], yielding data items d[0] to d[n−1]. Thereafter these data items are re-encrypted with the key data k[1] at the same time or subsequently, and the resultant data items d"[0] . . . d"[n−1] are stored in the memory device. Data items d'[0] . . . d'[n−1] can also be re-encrypted with the key data k[1] to obtain d'''[0] . . . d'''[n−1]. The decryption method is as described above.

In this embodiment, encrypted data is stored only in the memory devices provided in the information processing unit and is not output to the outside. Furthermore, high-security information processing units are provided with tamper-proof devices, making access to the devices held therein difficult, preventing internally held data from being known. Therefore, it is difficult for an analyzer to recognize input-output text pairs that are necessary to analyze the encryption keys and to determine key data items used in the devices. Thus, it is possible to use the same key data for a fixed time period, instead of updating the key data every time data is processed and read out.

It is obvious that secret-key cryptosystems other than DES can be used. Public-key cryptosystems can also be used, but processing speeds will decrease. When a public-key cryptosystem is used, a pair of keys e[0] and d[0] is generated, where e[0] is an encryption key and d[0] is a decryption key. Data x encrypted with e[0] is stored in a memory device. The data x is read from the memory device and decrypted with d[0], yielding the decrypted data x'. A new pair of keys e[1] and d[1] is generated, where e[1] is an encryption key and d[1] is a decryption key. The decrypted data x' is re-encrypted with the encryption key e[1], and the re-encrypted data x" is stored in the memory device.

In a secret-key cryptosystem, the same key must be used at least two times, once for encryption and once for decryption, while in a public-key cryptosystem, different keys are used at the time of encryption and decryption, so it is possible to limit the number of uses of each encryption key and decryption key only to one. This can make it difficult to predict the decryption key even if the encryption key is revealed, and vice versa. In general, since data analysis becomes more difficult as the number of chances to observe the data decreases, it is preferable to use public-key cryptosystems for security-critical applications. Thus, although cryptographic processing using a secret-key cryptosystem is being assumed unless otherwise specified, a public-key cryptosystem is also applicable.

Second Exemplary Embodiment

This embodiment relates to randomization of execution orders and data locations.

(2-1) Deciphering Method Using Data Location Information

Suppose the modular exponentiation $y^x$ mod N is performed. Modular exponentiation is an essential operation in the RSA public-key cryptographic algorithm. In RSA, N is a public key and known information, y is input data, and x is a secret exponent. Modular exponentiation has to be performed to prevent leakage of the secret exponent x.

A known method of performing modular exponentiation operations at high speed is the Addition Chain method. This embodiment provides an example using the 2-bit Addition Chain method. Suppose x is 2048 bits long, and x[i] presents the ith 2-bit block. That is, $0 \leq x[i] \leq 3$. The following operation is performed.

```
S[0] = 1;
For (I = 0; i< 1024; i++) {
    S[i] = S[i]^4 mod N;                            (a)
    Switch(x[i]) {
        Case 0:
            S[i + 1] = S[i]* y^0 mod N;             (b-1)
            Break;
        Case 1:
            S[i + 1] = S[i]* y^1 mod N;             (b-2)
            Break;
        Case 2:
            S[i + 1] = S[i]* y^2 mod N;             (b-3)
            Break;
        Case 3:
            S[i + 1] = S[i]* y^3 mod N;             (b-4)
            Break;
    }
    return S[n];
```

The operation is divided into four branches (b-1) to (b-4) depending on the value of the secret exponent. If x is a random number, operations (b-1) to (b-4) are processed 256 times each on the average. For operations (b-1) to (b-4), to obtain $y^0$ mod N, $y^1$ mod N, $y^2$ mod N, and $y^3$ mod N by performing multiplication modulo N, data stored in the memory device must be read out. By observing the data that is transferred and used at the time of multiplication modulo N, an attacker can tell which operation among operations (b-1) to (b-4) is being performed, and accordingly identify the corresponding x[i]. The secret exponent can be determined in this way.

Figure 7:
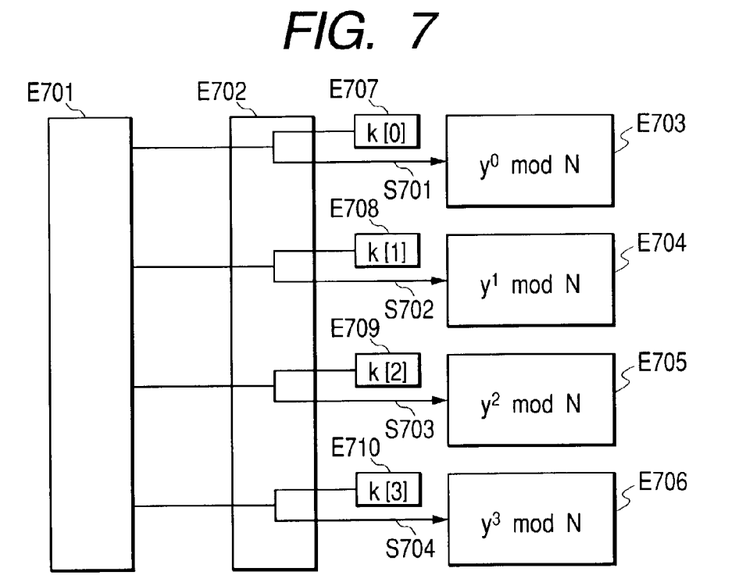
FIG. 7 is a block diagram showing an information processing unit that encrypts and decrypts data from a memory device using key data and that encrypts and decrypts data using new key data (when storing initial data)
Figure 8:
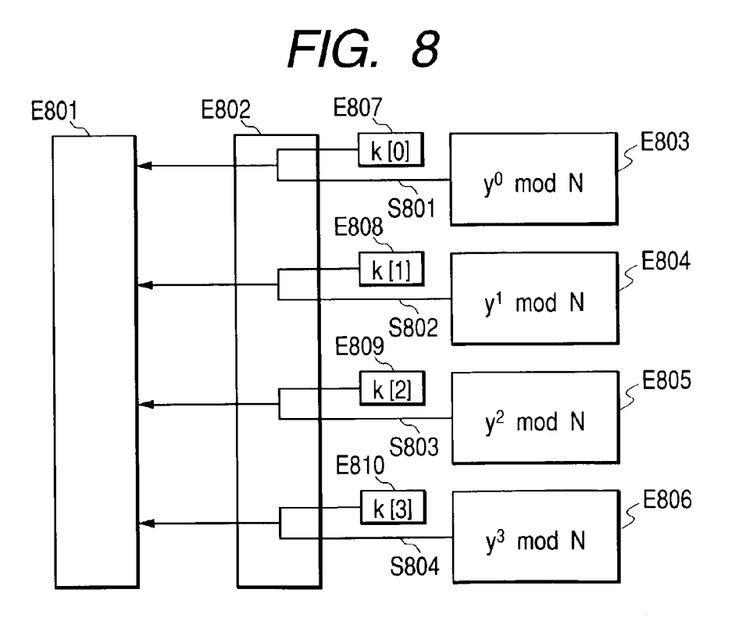
FIG. 8 is a block diagram showing an information processing unit that encrypts and decrypts data read from a memory device using key data, then encrypts and decrypts the data and writes the data back using new key data (when reading the data)
Figure 9:
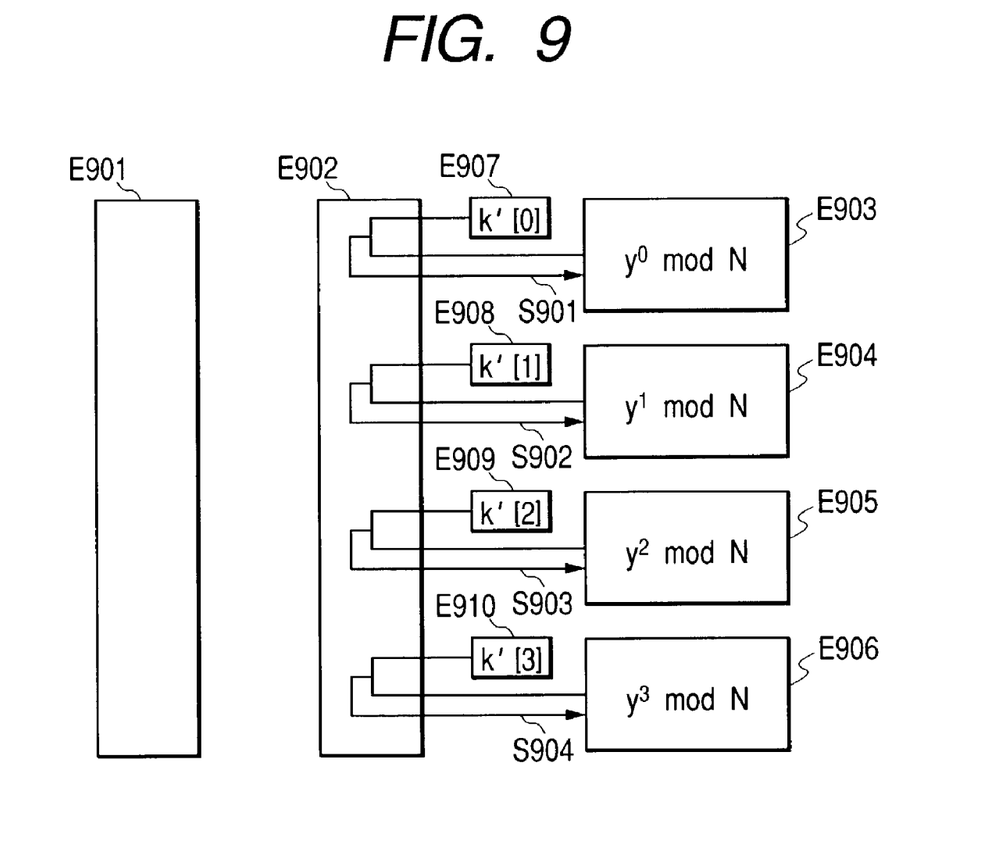
FIG. 9 is a block diagram showing an information processing unit that encrypts and decrypts data read from a memory device using key data, then encrypts and decrypts the data and writes the data back using new key data (when re-encrypting data)

The information processing unit according to this embodiment generates $y^0$ mod N, $y^1$ mod N, and $y^2$ mod N, and $y^3$ mod N from input y as an initial calculation, encrypts them using key data k[0] E707, k[1] E708, k[2] E709, and k[3] E710 respectively, then stores them in the form of a table E703, E704, E705, E706 so that they can be referenced later (see, FIG. 7). One loop in the Addition Chain process divides the operation into one of the branches (b-1) to (b-4), and the table data is read out in the way shown in FIG. 8 (steps S801, S802, S803, and S804). The read data is decrypted with the corresponding key data (E807, E808, E809, and E810) in an encryption/decryption unit E802, and is then transmitted to the external output E801 of the calculation equipment or the memory device or the information processing unit. The data according to the calculations $y^0$ mod N, $y^1$ mod N, $y^2$ mod N, and $y^3$ mod N stored in the memory device are all encrypted afresh with new encryption keys k'[0] E907, k'[1] E908, k'[2] E909, and k'[3] E910, as shown in FIG. 9, then stored in the memory device (steps S901, S902, S903, and S904). This prevents the analyzer from knowing which one of the operations (b-1) to (b-4) is used, because if $y^0$ mod N is used in a loop and it is used again thereafter, the values read out in each case are different.

In this description, the key data items from k[0] to k[3] and from k'[0] to k'[3] are assumed to be different from each other, but it is possible to make the memory device used for storing key data more compact by defining k[0]=k[1]=k[2]=k[3] and k'[0]=k'[1]=k'[2]=k'[3]. In addition, it is possible to use different memory devices for k[0] to k[3] and k'[0] to k'[3], and it is also possible to make the memory device more compact by rewriting data to enable the use of the same memory device. Furthermore, the increase in processing time can be minimized if only data that has been used is re-encrypted with a new encryption key. In this case, the encryption keys are held in association with the data items as shown in FIGS. 7, 8, and 9.

Although this embodiment has been described with respect to the 2-bit Addition Chain method, it can also be applied to the general n-bit Addition Chain method, the Sliding Window method, and other methods in which it is necessary to read out the same data repetitively, including cases other than modular exponentiation.

(2-2) Randomization of Execution Order

Figure 10:
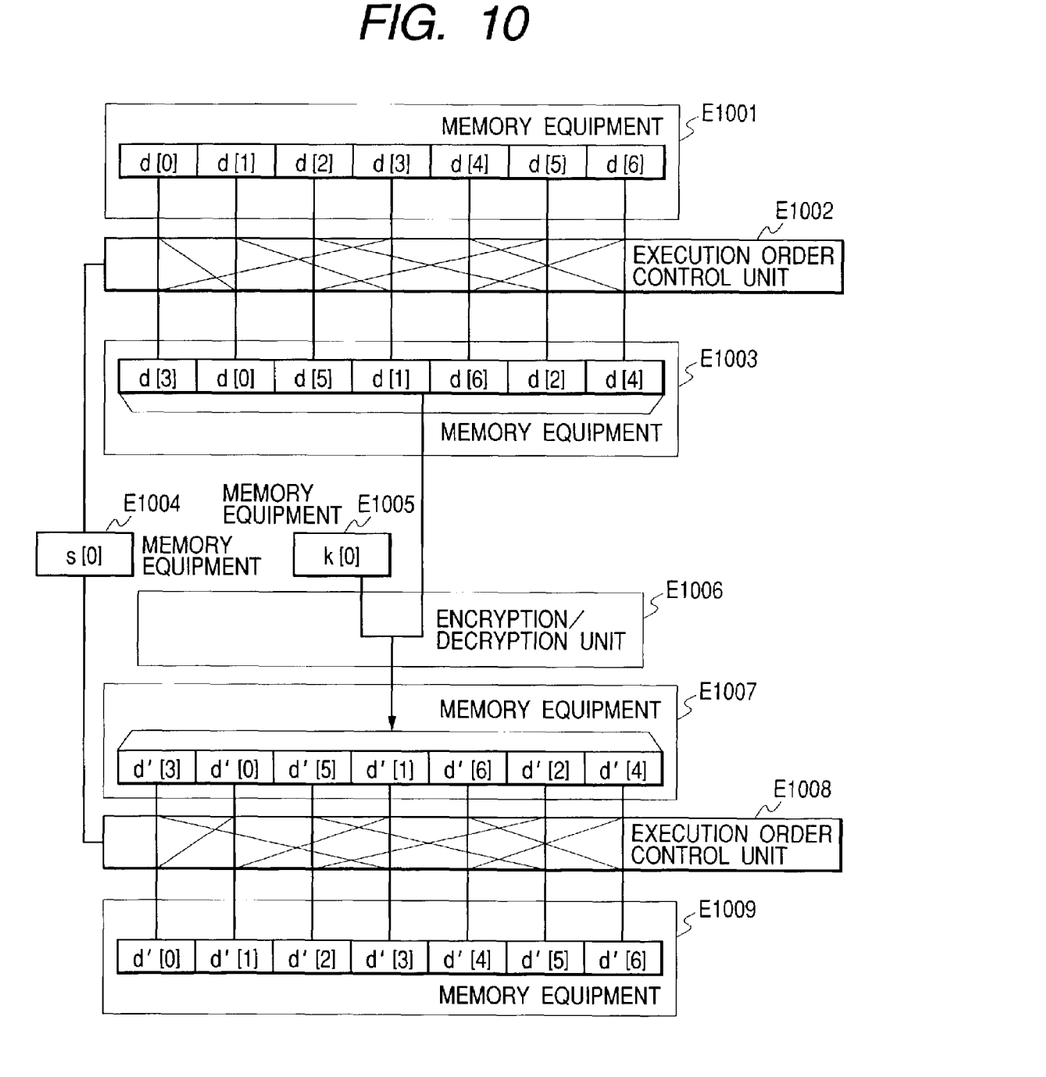
FIG. 10 is a block diagram showing an information processing unit (during encryption)
Figure 11:
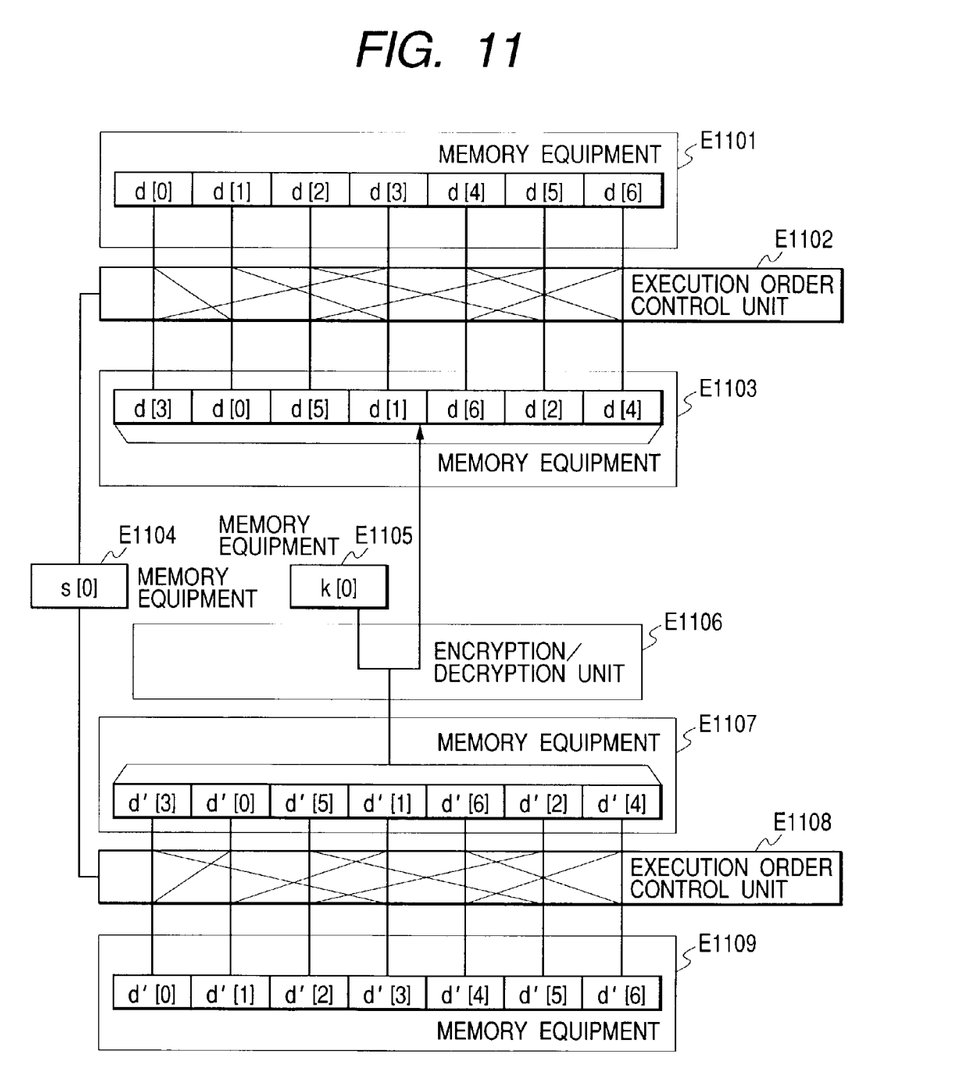
FIG. 11 is a block diagram showing an information processing unit that changes the processing order of data in the memory device using data for determining execution order, performs encryption and decryption of data using key data, and restores the order of the encrypted or decrypted data to the order at the time of the input using the data for determining execution order (during decryption)

FIG. 10 shows an encryption unit that performs encryption processing in a random order, and FIG. 11 shows the corresponding decryption unit. In the information processing unit, an execution order control unit E1002 reads data from a memory device E1001 with execution order control data s[0] stored in a memory device E1004, and stores data in a permuted location order in a memory device E1003. Calculation equipment E1006 in the encryption/decryption unit encrypts the data stored in the memory device E1003 with key data k[0] sequentially, and stores the encrypted data in another memory device E1007. An execution order control unit E1008 performs the permutations performed in the execution order control unit E1002 in reverse by using the execution order control data s[0], and stores data in a memory device E1009 in the same order in which the encrypted data was stored in the memory device E1001. The execution order control data stored in the memory device E1004 can be defined arbitrarily by the user or can be input from a random number generator. In particular, there is no necessity for the execution order control data s[0] E1004 and s[1] E1104 to be the same.

Although, in this embodiment, the memory devices E1001 and E1003 in the encryption unit, and E1007 and E1009 in the decryption unit in FIG. 10, and the memory devices E1101 and E1103 in the encryption unit, and E1107 and E1109 in the decryption unit in FIG. 11 are described as different memory devices, each pair of memory devices may be combined into one memory device by updating the data stored therein. Also, memory devices E1001, E1003, E1007, and E1009 and memory devices E1101, E1103, E1107, and E1109 can each be implemented as one memory device.

Figure 12:
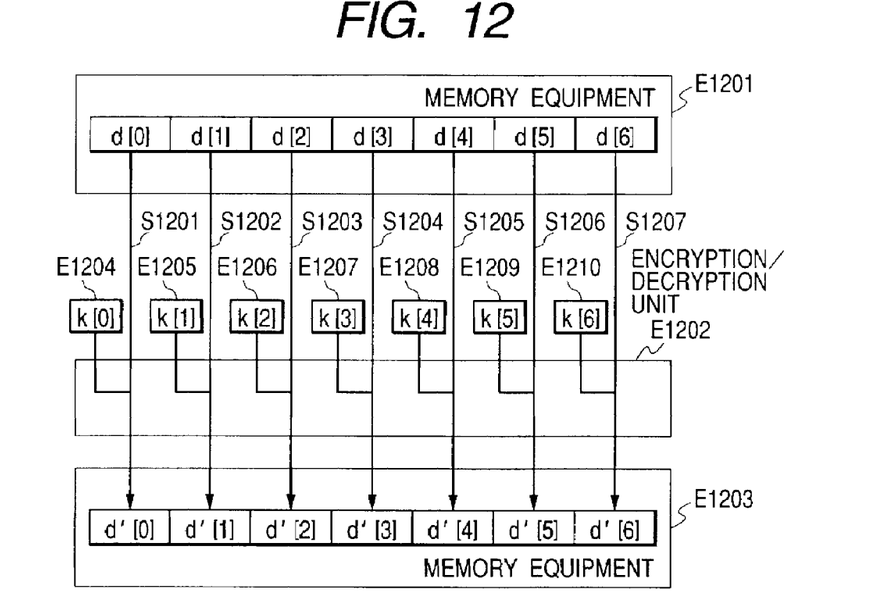
FIG. 12 is a block diagram showing an information processing unit that performs encryption/decryption by changing the processing order.

Furthermore, as shown in FIG. 12, faster cryptographic processing is possible by permuting only the execution orders of processes S1201, S1202, S1203, S1204, S1205, S1206, and S1207, instead of following the procedure that permutes the order of data read from the memory device in the execution order control unit and restores the data after the permutation before starting the encryption and decryption operation. More specifically, the processing order, which is ordinarily sequential from d[0] to d[6], is manipulated so as to always be unpredictable. As in the first embodiment, execution order control data can be held to define the execution order, thereby allowing the user to define the order by himself, or a random number generator can generate execution order control data to cause processing to be performed, in an order that can not be predicted by the analyzer. In FIG. 12, the key data items E1204 to E1210 are assumed to be different from each other, but they can be combined into one key data as $$k[0]=k[1]=k[2]=k[3]=k[4]=k[5]=k[6]$$

(2-3) Randomization of Data Locations

As described above, data to be processed by information processing units is characterized by two parameters: one indicating its notation and the other indicating its location, such as binary notation in computers and the address in a CPU address space. Data analysis methods and their countermeasures depending on notation are as described above. An embodiment of the countermeasures against data analysis using data addresses will now be described.

This embodiment assumes modular exponentiation. The 2-bit Addition Chain method is used as described above.

This method hides the expressions $y^0$ mod N, $y^1$ mod N, $y^2$ mod N, and $y^3$ mod N by encrypting them to prevent the analyzer from predicting which one of (b-1), (b-2), (b-3), and (b-4) is used, and stores them in the memory device. In addition, this embodiment changes data locations. As an example, permutations of data locations will be described.

Figure 13:
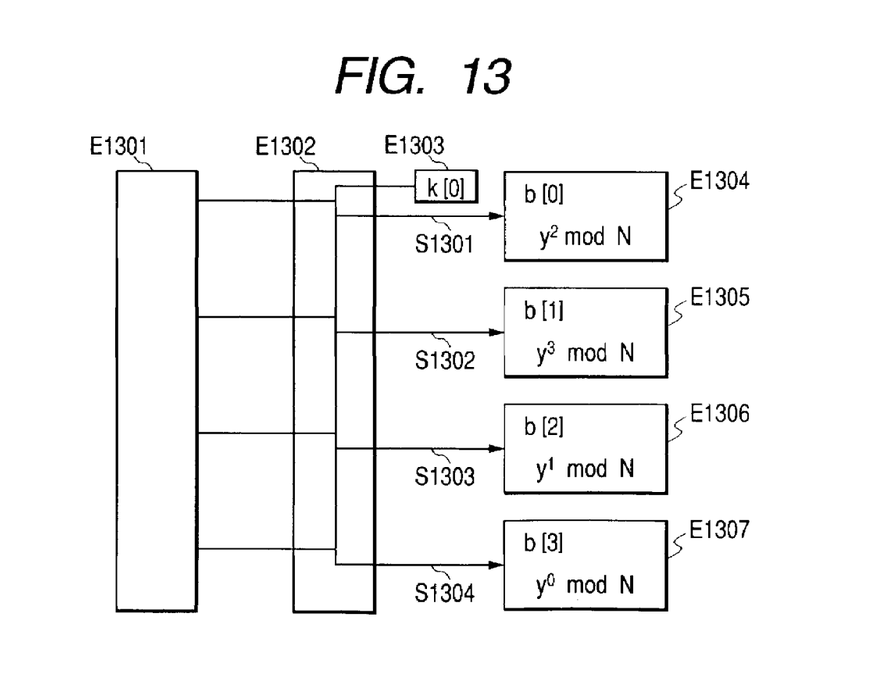
FIG. 13 is a block diagram showing an information processing unit that changes data storage positions, then encrypts and decrypts data, and stores the data.

As shown in FIG. 13, an information processing unit provides four blocks b[0] (E1304), b[1] (1305), b[2] (1306), and b[3] (1307) to store $y^0$ mod N, $y^1$ mod N, $y^2$ mod N, and $y^3$ mod N, respectively. As the initial calculation, $y^0$ mod N, $y^1$ mod N, $y^2$ mod N, and $y^3$ mod N are generated from input y, and encrypted with encryption key k[0], then stored in the corresponding blocks described above. At this time, the values of $y^0$ mod N, $y^1$ mod N, $y^2$ mod N, and $y^3$ mod N that have been encrypted with the encryption key k[0] are stored in a random order in the blocks b[0] to b[3] (steps S1301, S1302, S1303, and S1304).

Figure 14:
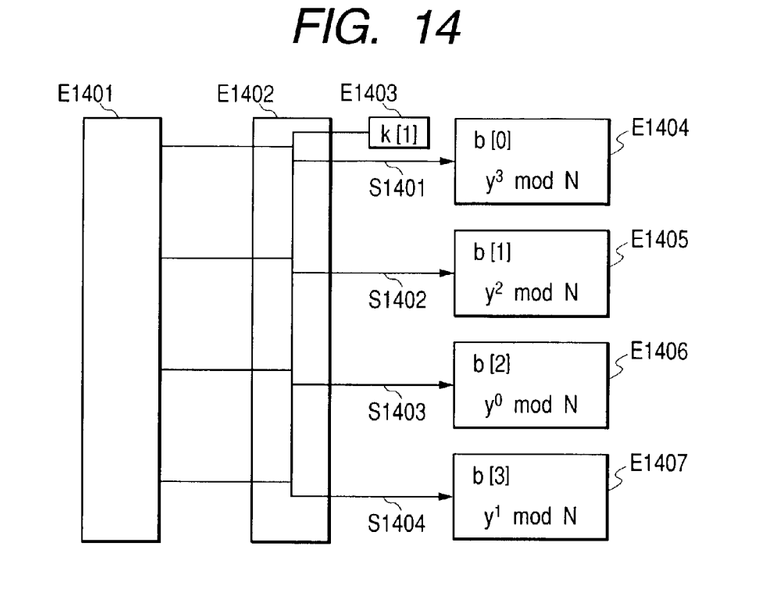
FIG. 14 is a block diagram showing an information processing unit that changes data storage positions, then encrypts and decrypts data, and stores the data.
Figure 15:
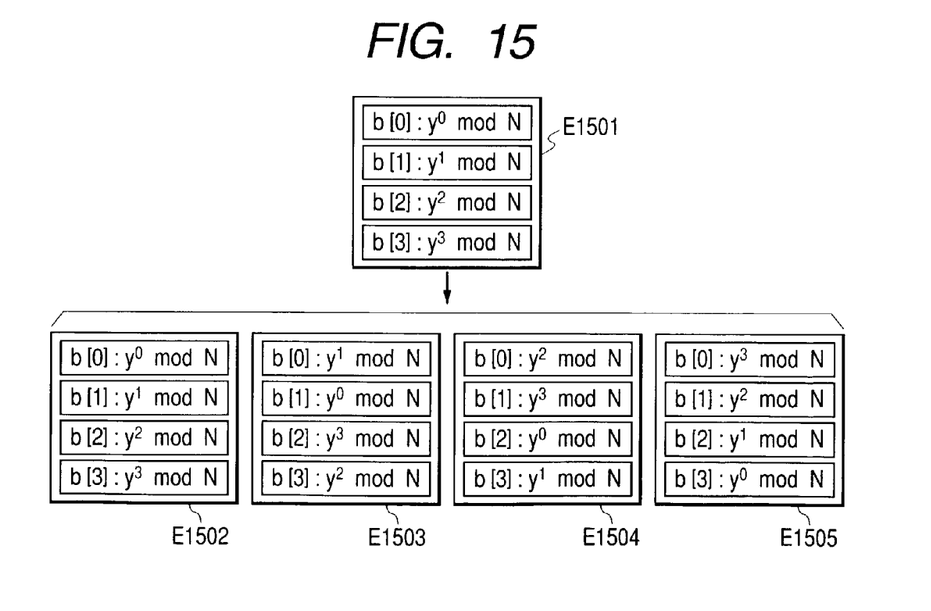
FIG. 15 is an explanatory diagram showing a method of interchanging data storage positions such that the interchanged storage positions cannot be estimated from the original storage positions.

This embodiment permutes the blocks b[0] to b[3] in random order on every processing loop and re-encrypts all of $y^0$ mod N, $y^1$ mod N, $y^2$ mod N, and $y^3$ mod N stored in the blocks b[0] to b[3] in undefined order with a new encryption key k[1] and stores the results (steps S1401 to S1404 in FIG. 14). However, there is no need to permute all blocks b[0] to b[3] at every processing loop. Suppose, for example, a value stored in b[0] is read out. A permutation of b[0] and one of the blocks b[1] to b[3] is performed using output from the random number generator with the probability of 3/4. The probability that each one of the blocks b[1] to b[3] will be selected to be permuted with b[0] is set at 1/3. As shown by the state change from E1501 to E1503 in FIG. 15, if b[0] is permuted with b[1], then b[2] and b[3] are also permuted. Similarly, if b[0] is permuted with b[2], then b[1] and b[3] are permuted (E1504); if b[0] is permuted with b[3], then b[1] and b[2] are permuted (E1505). By following this procedure, the probability that accessing b[0] afresh encounters the previous data becomes 1/4. As is evident from FIG. 15, the probability that the same data is stored when b[1], b[2], and b[3] are accessed afresh each also becomes 1/4. Each of E1502, E1503, E1504, and E1505 in FIG. 15 occurs with the probability of 1/4, so the analyzer cannot obtain information about the data being processed from the locations at which the data are accessed.

There is some probability that the permutation target locations may be determined from the locations accessed at the time of permutation. For example, differences among permutations b[0] and b[1], b[0] and b[2], and b[0] and b[3] may be observed due to the locations accessed. Therefore, it is preferable if accesses are made to all the blocks lest unexecuted permutations should be observed.

In this embodiment, permutations of locations are performed to eliminate the need for extra space in the memory device. A similar effect can be produced by providing a storage area larger than the size of the data to be stored and changing the storage locations arbitrarily. If the processing order of the steps by which the storage locations are changed is randomized in the way described above, the analysis can be made more difficult.

It is impossible to eliminate noise contained in measurement data such as quantities of current consumption data and electromagnetic radiation data by operation on one measurement data item. It is necessary to eliminate such noise by averaging measurement data obtained from a plurality of measurements. When the data vary at every measurement, however, or vary before an adequate number of measurement samples are obtained to eliminate noise, an averaging operation will only mix up the signal elements in the data. Therefore, the analyzer cannot infer the contents of the target data through observation of the current consumption.

By reducing the correlation between the data being processed and the current consumption and electromagnetic radiation of the information processing unit, though using comparatively small-scale hardware and with comparatively little computational overhead, the embodiments of the present invention can make it difficult or impossible for an analyzer to obtain information.

Nothing in the above description is meant to limit the present invention to any specific materials, geometry, or orientation of parts. Many part/orientation substitutions are contemplated within the scope of the present invention. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. An information processing unit, comprising:
   a calculation equipment;
   first and second memory devices;
   a first bus line that links the calculation equipment and the first memory device; and
   a second bus line that links the calculation equipment and the second memory device;
   wherein the calculation equipment receives first key data stored in the first memory device through the first bus line,
   wherein the calculation equipment encrypts input data using the first key data and stores the encrypted data in the second memory device,
   wherein the calculation equipment reads out the encrypted data from the second memory device, re-encrypts the encrypted data using second key data without the decryption of the encrypted data and stores the re-encrypted data in the second memory device, wherein the calculation equipment reads out the re-encrypted data from the second memory device and decrypts the re-encrypted data using third key data generated from the first and second key data, wherein the input data is separated into a plurality of blocks and each block is encrypted using the first and second key data and decrypted using the third key data, and further wherein the execution order of encryption/decryption processing of the sequence of blocks is randomly changed with an execution order control data which is stored in a memory.

2. The information processing unit of claim 1, wherein the first memory device is an internal register.

3. The information processing unit of claim 1, wherein the second memory device is a random access memory (RAM).

4. The information processing unit of claim 1, wherein after receiving the first key data, the calculation equipment receives different input data a plurality of additional times.

5. The information processing unit of claim 4, wherein the calculation equipment receives new key data for encrypting the input data every time different input data is received.

6. The information processing unit of claim 4, wherein the calculation equipment receives new key data for encrypting the input data at periodic intervals.

7. The information processing unit of claim 1, wherein the first and second key data is generated randomly.

8. The information processing unit of claim 1, wherein a plurality of key data items are provided in advance to be selectively used by the calculation equipment to encrypt/decrypt input data.

9. The information processing unit of claim 1, wherein the first and second key data is used to encrypt/decrypt a sequence of two or more successive blocks.

10. The information processing unit of claim 9, wherein the block data and the first and second key data have the same data size.

11. The information processing unit of claim 10, wherein the block data size is 32 bits.

12. The information processing unit of claim 1, wherein an exclusive OR operation is used for encryption/decryption of the input data with the key data.

13. The information processing unit of claim 1, wherein an XOR operation is used as the encryption and decryption, and wherein the third key data is generated from the XOR operation between the first key data and the second key data.

14. A method for using an information processing unit, said information processing unit including a calculation equipment, first and second memory devices, a first bus line that links the calculation equipment and the first memory device, and a second bus line that links the calculation equipment and the second memory device, comprising the steps of:

receiving, by the calculation equipment, first key data stored in the first memory device through the first bus line;

encrypting, by the calculation equipment, input data using the first key data;

storing, by the calculation equipment, the encrypted data in the second memory device;

reading out, by the calculation equipment, the encrypted data from the second memory device, re-encrypting the encrypted data using second key data without the decryption of the encrypted data and storing the re-encrypted data in the second memory device; and reading out, by the calculation equipment, re-encrypted data from the second memory device and decrypting the re-encrypted data using third key data generated from the first and second key data, wherein the input data is separated into a plurality of blocks and each block is encrypted using the first and second key data in the encrypting step and decrypted using the third key data in the decrypting step, and further wherein the execution order of encryption/decryption processing of the sequence of blocks in the encrypting/decrypting step is randomly changed.

15. The method of claim 14, wherein an XOR operation is used as the encryption and decryption, and wherein the third key data is generated from the XOR operation between the first key data and the second key data.

16. An information processing unit, comprising:

a memory device;

calculation means; and a bus line that links the calculation means and the memory device, wherein the calculation means is adapted, in use, to encrypt a data using first key data and store the encrypted data in the memory device, wherein said calculation means is adapted to read out the encrypted data from the memory device and to re-encrypt the encrypted data using second key data without the decryption of the encrypted data and to store the re-encrypted data, and adapted to read out the re-encrypted data from the memory device and to decrypt the re-encrypted data using third key data generated from the first and second key data.

17. The information processing unit of claim 16, wherein an XOR operation is used as the encryption and decryption, and wherein the third key data is generated from the XOR operation between the first key data and the second key data.

* * * * *